(12) United States Patent
Jang et al.

(10) Patent No.: US 8,414,800 B2
(45) Date of Patent: Apr. 9, 2013

(54) SEMICONDUCTOR NANOCRYSTAL COMPOSITES

(75) Inventors: Hyo Sook Jang, Seongnam-si (KR); Young Hwan Kim, Seongnam-si (KR); Eun Joo Jang, Suwon-si (KR); Shin Ae Jun, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 397 days.

(21) Appl. No.: 12/463,056

(22) Filed: May 8, 2009

(65) Prior Publication Data

US 2010/0155676 A1 Jun. 24, 2010

(30) Foreign Application Priority Data

Dec. 19, 2008 (KR) .................. 10-2008-0130255

(51) Int. Cl.
*H01B 1/20* (2006.01)

(52) U.S. Cl.
USPC .............. 252/500; 257/9; 428/403; 428/457

(58) Field of Classification Search .............. 252/518, 252/301.35, 500; 428/323, 403, 457; 257/9
See application file for complete search history.

(56) References Cited

U.S. PATENT DOCUMENTS

| | | | | |
|---|---|---|---|---|
| 5,914,174 A * | 6/1999 | Gupta et al. | ................. | 428/174 |
| 7,777,233 B2 * | 8/2010 | Kahen et al. | .................. | 257/79 |
| 2004/0009341 A1 * | 1/2004 | Naasani | ........................ | 428/323 |
| 2004/0247861 A1 * | 12/2004 | Naasani | ........................ | 428/336 |
| 2007/0012928 A1 * | 1/2007 | Peng et al. | ....................... | 257/79 |
| 2008/0076870 A1 * | 3/2008 | Hiraoka | ........................ | 524/588 |
| 2009/0247406 A1 * | 10/2009 | De Corte et al. | .............. | 504/189 |
| 2010/0264371 A1 * | 10/2010 | Nick | ........................ | 252/301.36 |

FOREIGN PATENT DOCUMENTS

| | | |
|---|---|---|
| JP | 2007-154198 | 6/2007 |
| KR | 1020030082065 A | 10/2003 |
| KR | 1020080027791 A | 3/2008 |
| KR | 100823487 B1 | 4/2008 |
| KR | 1020080068841 A | 7/2008 |
| WO | WO 2005121266 A1 * | 12/2005 |
| WO | 2006/045713 A1 | 5/2006 |

OTHER PUBLICATIONS

Hindered aminoethers: a new class of radical scavengers for coatings. Bramer et al. Polymeric Materials Science abd Engineering (1990), 63, 647-53.*

Chapter 8. Site Specific Laser Chemistry Relevant to III-V Semiconductor Growth. Xiaodong Xu et al. In Laser Chemistry of Organometallics: Chaiken, J.; ACS Symposium Series: American Chemical Society: Washington DC. 1993.*

* cited by examiner

*Primary Examiner* — Mark Eashoo
*Assistant Examiner* — M. Reza Asdjod
(74) *Attorney, Agent, or Firm* — Cantor Colburn LLP

(57) ABSTRACT

A semiconductor nanocrystal composite comprises semiconductor nanocrystals, a matrix material, and a radical scavenger disposed between the semiconductor nanocrystals and the matrix material. A semiconductor nanocrystal composite also comprises a matrix containing semiconductor nanocrystals and a radical scavenger surrounding the matrix. An electronic device also comprises the semiconductor nanocrystal composite.

14 Claims, 3 Drawing Sheets

US 8,414,800 B2

SEMICONDUCTOR NANOCRYSTAL COMPOSITES

CROSS-REFERENCE TO RELATED APPLICATION

This application claims priority to Korean Patent Application No. 10-2008-130255, filed on Dec. 19, 2008, and all the benefits accruing therefrom under 35 U.S.C. §119, the content of which is incorporated herein by reference in its entirety.

BACKGROUND

1. Field

The present disclosure is directed to semiconductor nanocrystal composites. More specifically, the semiconductor nanocrystal composites can protect semiconductor nanocrystals from degradation by radicals generated by a light source or external factors.

2. Description of the Related Art

A semiconductor nanocrystal, also referred to as a quantum dot ("QD"), is a crystalline semiconductor material having an average largest dimension, sometimes referred to herein as "average particle size", of several nanometers (where nanoparticles are typically have a particle size of 1 nm to 100 nm, and a maximum particle size as high as several hundred nanometers), and composed of several hundred to several thousand atoms. A semiconductor nanocrystal has a large surface area per unit volume and exhibits various desirable electronic effects (e.g., quantum confinement) due to its small (e.g., several nanometers) average particle size. These structural characteristics and effects account for unique physicochemical properties of the semiconductor nanocrystal different from those found in bulk semiconductor materials of the same composition but with an average particle size greater than that of the semiconductor nanocrystal. For example, semiconductor nanocrystals absorb light from an excitation source to reach a higher energy excited state and emit energy corresponding to the energy band gap. Based on this principle, the energy band gap of semiconductor nanocrystals can be controlled by varying the size and/or composition of the semiconductor nanocrystals to produce light of various wavelengths from the semiconductor nanocrystals. Therefore, semiconductor nanocrystals find applications as luminescent materials in a variety of electronic devices, including display devices and bioluminescent display devices. Semiconductor nanocrystals free of toxic heavy metals such as lead and mercury possess many advantages as luminescent materials because of their environmental friendliness and safety in humans. Many techniques for controlling the size, structure and uniformity of semiconductor nanocrystals are currently being developed in order to utilize excellent characteristics and broad applicability of the semiconductor nanocrystals.

Semiconductor nanocrystals are currently employed for the fabrication of display devices and in other applications. The semiconductor nanocrystals may be used without any modification or in the form of composites in which the semiconductor nanocrystals are contained in a polymeric or inorganic matrix. However, the intrinsic characteristics of the semiconductor nanocrystals in these applications inevitably degrade during routine operation of the devices as well as by other external factors.

SUMMARY

Disclosed herein is a nanocrystal composite that includes semiconductor nanocrystals, a matrix material, and a radical scavenger disposed between the semiconductor nanocrystals and the matrix material.

In one exemplary embodiment, the semiconductor nanocrystals may be surrounded by the radical scavenger or the surfaces of the semiconductor nanocrystals may be partially or entirely coated with the radical scavenger.

Also disclosed herein is a nanocrystal composite that includes a matrix containing semiconductor nanocrystals and a radical scavenger surrounding the matrix.

In an exemplary embodiment, the radical scavenger may be selected from the group consisting of piperidine compounds, hydroxylamine compounds, lactone compounds, benzophenone compounds, benzotriazole compounds, and mixtures thereof.

The nanocrystal composites can be applied to electronic devices. The electronic devices may be selected from the group consisting of light emitting devices ("LEDs"), laser devices, memory devices, sensors, electroluminescent devices and photovoltaic devices.

BRIEF DESCRIPTION OF THE DRAWINGS

The exemplary embodiments will be more clearly understood from the following detailed description taken in conjunction with the accompanying drawings, where.

DETAILED DESCRIPTION

Figure 1:
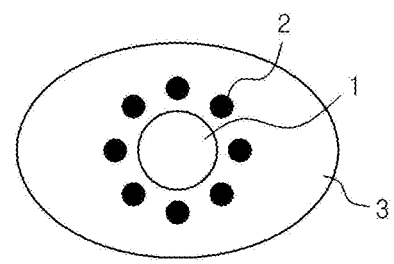
FIG. 1 is a schematic diagram illustrating an exemplary embodiment of a nanocrystal composite.

Exemplary embodiments will now be described in greater detail hereinafter with reference to the accompanying drawings, in which embodiments of the invention are shown. These exemplary embodiments may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present. It will be understood that when a material is referred to as "surrounding" another material, it can directly surround the other material or one or more intervening materials may be disposed therebetween. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings hereof.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In an embodiment, a nanocrystal composite includes semiconductor nanocrystals, a matrix material, and a radical scavenger present between the semiconductor nanocrystals and the matrix material.

A polymer or an oxide is used as the matrix material. Therefore, chemical functional groups, acids, bases, catalysts, and the like may be present in the matrix material. These additional groups and materials may be exposed to a light source or external factors to generate radicals when the nanocrystal composite is used to fabricate a device such as an electronic device. The radicals can react with the semiconductor nanocrystals to form defects, cause a change in the redox state of the nanocrystals, or oxidize the nanocrystals. In this way, the characteristics of the semiconductor nanocrystals may be degraded by the radicals. Further, the operation of the device may cause an increase in the amount of the radicals that can further degrade the characteristics of the semiconductor nanocrystals.

FIG. 1 is a schematic diagram illustrating an exemplary embodiment of the nanocrystal composite. Referring to FIG. 1, the nanocrystal composite includes a semiconductor nanocrystal 1, a radical scavenger 2 and a matrix material 3. The radical scavenger 2 is disposed between the semiconductor nanocrystal 1 and the matrix material 3. This structure affords semiconductor nanocrystal 1 protection from degradation by radicals generated by the matrix material 3. The radical scavenger 2 may surround the semiconductor nanocrystal 1 without coating the semiconductor nanocrystal 1. Alternatively, the surface of the semiconductor nanocrystal 1 may be partially or entirely coated with the radical scavenger 2. This surrounding or coating makes the radical scavenger 2 effective as a barrier blocking the radicals from entering the semiconductor nanocrystal 1.

Figure 2:
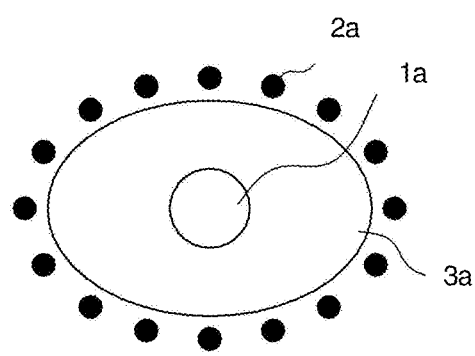
FIG. 2 is a schematic diagram illustrating another exemplary embodiment of a nanocrystal composite.

FIG. 2 is a schematic diagram illustrating another exemplary embodiment of the nanocrystal composite. Referring to FIG. 2, the nanocrystal composite includes a matrix 3a containing a semiconductor nanocrystal 1a and a radical scavenger 2a surrounding the matrix 3a. The radical scavenger 2a blocks radicals generated by external factors from entering the matrix 3a, and prevents a chain reaction of the radicals with the matrix 3a to inhibit the generation of a larger amount of radicals from the matrix 3a.

The radical scavenger 2a may surround the entire surface or only a portion of the surface of the matrix 3a. Even when the radical scavenger 2a surrounds only a portion of the surface of the matrix 3a in contact with an external factor, the radical scavenger 2a can prevent the generation of radicals initiated by the external factors.

Figure 3:
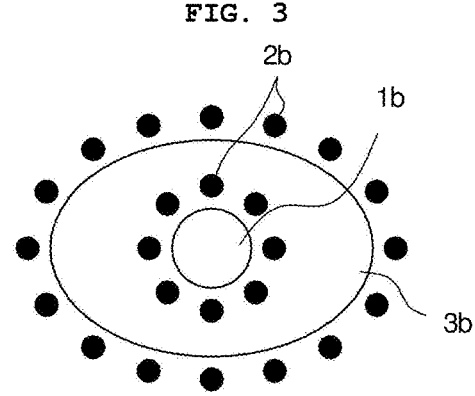
FIG. 3 is a schematic diagram illustrating another exemplary embodiment of a nanocrystal composite.

FIG. 3 is a schematic diagram illustrating another exemplary embodiment of the nanocrystal composite. Referring to FIG. 3, the nanocrystal composite includes a semiconductor nanocrystal 1b, a matrix material 3b, and a radical scavenger 2b. The radical scavenger 2b is disposed between the semiconductor nanocrystal 1b and the matrix material 3b and surrounds the matrix material 3b.

The radical scavenger is a compound that can react with radicals to remove the reactivity of the radicals or a compound that can react with a radical source to prevent or inhibit the generation of radicals from the radical source. The radical scavenger may be a compound that can trap radicals to form a more stable compound, a compound that can supply protons to a radical intermediate, or a compound that can decompose a radical intermediate into stable molecules.

In an exemplary embodiment, the radical scavenger may be selected from the group consisting of piperidine compounds, hydroxylamine compounds, lactone compounds, benzophenone compounds, benzotriazole compounds, and mixtures thereof. The radical scavenger may be a monomer, oligomer or polymer.

In an exemplary embodiment, the hydroxylamine compound may be di-tert-butylhydroxylamine, the lactone compound may be 5,7-di-tert-butyl-3-(3,4-dimethylphenyl)-3H-benzofuran-2-one, the benzophenone compound may be 2-hydroxybenzophenone, and the benzotriazole compound may be 2-(2-hydroxy-5-methylphenyl)benzotriazole.

In an exemplary embodiment, the radical scavenger may be a bis(2,2,6,6-tetraalkyl-4-piperidyl)alkanedioate represented by Formula 1:

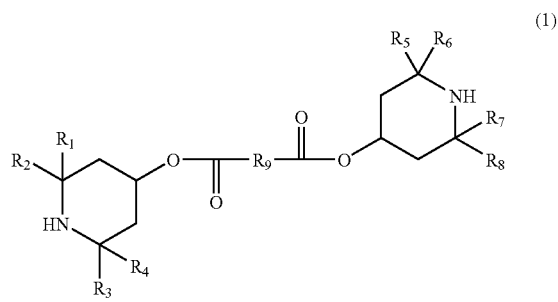

(1)

wherein each $R_1$ to $R_8$ is independently a $C_1$-$C_{24}$ alkyl group and $R_9$ is a $C_4$-$C_{24}$ alkylene.

In another exemplary embodiment, the radical scavenger may be bis-(2,2,6,6-tetramethyl-4-piperidyl)sebacate of Formula 2:

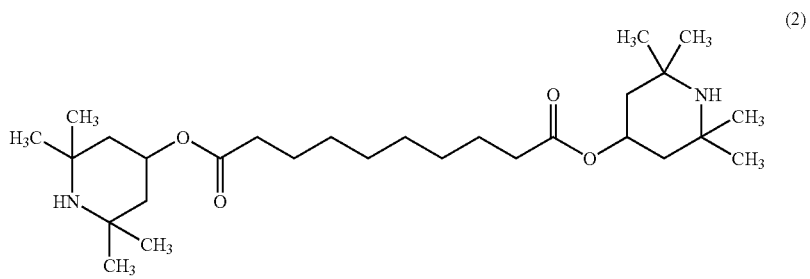

(2)

In an exemplary embodiment, the semiconductor nanocrystals may be selected from the group consisting of, but not limited to, Group II-VI semiconductor compounds, Group II-V semiconductor compounds, Group III-VI semiconductor compounds, Group III-V semiconductor compounds, Group IV-VI semiconductor compounds, Group II-III-VI compounds, Group II-IV-VI compounds, Group II-IV-V compounds, alloys thereof, and any mixture thereof.

In an exemplary embodiment, Group II elements may include Zn, Cd, Hg or a combination thereof, Group III elements may include Al, Ga, In, Ti or a combination thereof, and Group IV elements may include Si, Ge, Sn, Pb or a combination thereof. Also in an exemplary embodiment, Group V elements may include P, As, Sb, Bi or a combination thereof, and Group VI elements may include O, S, Se, Te or a combination thereof.

In an exemplary embodiment, Group II-VI semiconductor compounds may be selected from the group consisting of: binary compounds, such as CdSe, CdTe, ZnS, ZnSe, ZnTe, ZnO, HgS, HgSe and HgTe; ternary compounds, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgznSe; quaternary compounds, such as CdZnSeS, CdZnSeTe, CdZnSTe, CdHgSeS, CdHgSeTe, CdHgSTe, HgZnSeS, HgZnSeTe and HgznSTe; and any mixture thereof. In an exemplary embodiment, Group III-V semiconductor compounds may be selected from the group consisting of: binary compounds, such as GaN, GaP, GaAs, GaSb, AlN, AlP, AlAs, AlSb, InN, InP, InAs and InSb; ternary compounds, such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AllnN, AllnP, AllnAs and AllnSb; quaternary compounds, such as GaAlNAs, GaAlNSb, GaAlPAs, GaAlPSb, GaInNP, GaIn-NAs, GaInNSb, GaInPAs, GaInPSb, InAlNP, InAlNAs, InAlNSb, InAlPAs and InAlPSb; and any mixture thereof. In another exemplary embodiment, Group IV-VI semiconductor compounds may be selected from the group consisting of: binary compounds, such as SnS, SnSe, SnTe, PbS, PbSe and PbTe; ternary compounds, such as SnSeS, SnSeTe, SnSTe, PbSeS, PbSeTe, PbSTe, SnPbS, SnPbSe and SnPbTe; quaternary compounds, such as SnPbSSe, SnPbSeTe and SnPbSTe; and any mixture thereof. The Group IV semiconductor compounds may be selected from the group consisting of: elements such as Si and Ge; binary compounds, such as SiC and SiGe; and any mixture thereof.

In an embodiment, the semiconductor nanocrystals may have a core-shell structure. In another embodiment, the shell may include one or more layers. The shell may be composed of a Group II-VI semiconductor, a Group III-V semiconductor, a Group IV-VI semiconductor, or a combination thereof.

In an embodiment, the semiconductor nanocrystals may have a multilayer structure of two or more layers composed of different materials. In an embodiment, the multilayer structure of the semiconductor nanocrystals may include at least one alloy interlayer composed of two or more different materials at the interface between the adjacent layers. In another embodiment, the alloy interlayer may be composed of an alloy having a composition gradient.

The surfaces of the semiconductor nanocrystals may be capped with an organic ligand. Examples of the organic ligand include thiols, amines, phosphines, and carboxylic acids. The organic ligand may be a $C_6$-$C_{24}$ alkane or alkene having at least one terminal —COOH group, a $C_6$-$C_{24}$ alkane or alkene having at least one terminal —$PO_3H_2$ group, a $C_6$-$C_{24}$ alkane or alkene having at least one trisubstituted —PO group, a $C_6$-$C_{24}$ alkane or alkene having at least one terminal —SH group, or a $C_6$-$C_{24}$ alkane or alkene having at least one terminal —$NH_2$ group, —NH— group, or trisubstituted N group. Exemplary organic ligands include oleic acid, stearic acid, palmitic acid, hexyl phosphonic acid, n-octyl phosphonic acid, tetradecyl phosphonic acid, octadecyl phosphonic acid, trioctylphosphine oxide, n-octylamine, hexadecyl amine or trioctylamine.

The surfaces of the semiconductor nanocrystals may be partially or entirely coated with the radical scavenger instead of the organic ligand.

The matrix material may be an organic polymer or a metal or metalloid oxide. The organic polymer may be one that is transparent and curable in the wavelength range of 330 to 650 nm, and examples thereof include, but are not necessarily limited to: acrylic polymers, including polymethylmethacrylate ("PMMA") derivatives; polystyrene copolymers, including polystyrene ("PS") derivatives; polyvinylarylene polymers, including poly(1-vinylnaphthalene) ("PVN") derivatives; polybutadiene copolymers; polyisobutylene copolymers; phenolic polymers, including poly(4-vinylphenol) ("PVP") derivatives; novolac resins; imide polymers; aryl ether polymers; amide polymers; wholly or partially fluorinated polymers; p-xylene polymer, including parylene derivatives; vinyl alcohol polymers, including polyvinylalcohol ("PVA") derivatives; methyl siloxane polymers; and any combination thereof.

The metal or metalloid oxide may be one that is transparent and curable in the wavelength range of 330 to 650 nm. The metal or metalloid oxide may be selected from the group consisting of, but not necessarily limited to, $TiO_2$, ZnO, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$, $ZrSiO_4$, and any mixture thereof.

The nanocrystal composite may be employed in an electronic device. The electronic devices may be selected from the group consisting of LEDs, laser devices, memory devices, sensors, electroluminescent devices and photovoltaic devices.

Figure 4:
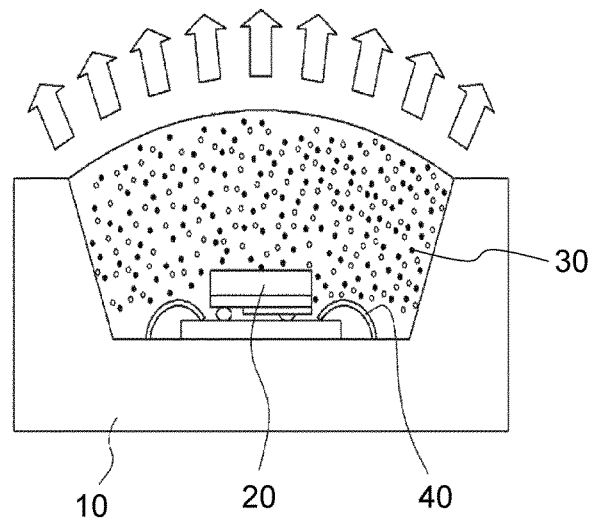
FIG. 4 is a schematic diagram illustrating an exemplary embodiment of an electronic device.

FIG. 4 is a schematic diagram illustrating an exemplary embodiment of the electronic device. Referring to FIG. 4, the electronic device includes a packaging frame 10, a light emitting diode chip 20 disposed on the packaging frame 10, and an emission layer 30 containing the nanocrystal composite. The light emitting diode chip 20 generates UV or blue light in the wavelength range of 360 to 440 nm to excite the semiconductor nanocrystals included in the semiconductor nanocrystal composite of the emission layer 30. For example, the light emitting diode chip 20 may be a UV light emitting device, such as a GaN light emitting diode. The light emitting diode chip 20 is composed of a p-type semiconductor and an n-type semiconductor, which are connected to respective electrodes by wires 40.

In the electronic device, the semiconductor nanocrystals absorb energy from the light emitting diode chip and emit light (see e.g., block arrows in FIG. 4) of a wavelength correlated to but red-shifted from the wavelength of the excitation energy. The emission wavelength of the electronic device may be varied depending on the kind and size of the semiconductor nanocrystals. In addition, the electronic device has a high color purity. Therefore, the electronic device can emit light of various colors, including white, depending on the kind of the light emitting diode chip 20 and the type of the nanocrystals contained in the emission layer 30. For example, white light emission of the electronic device can be achieved when the light emitting diode chip emits blue light and the nanocrystal composite of the emission layer includes green emitting nanocrystals and red emitting nanocrystals.

Figure 5:
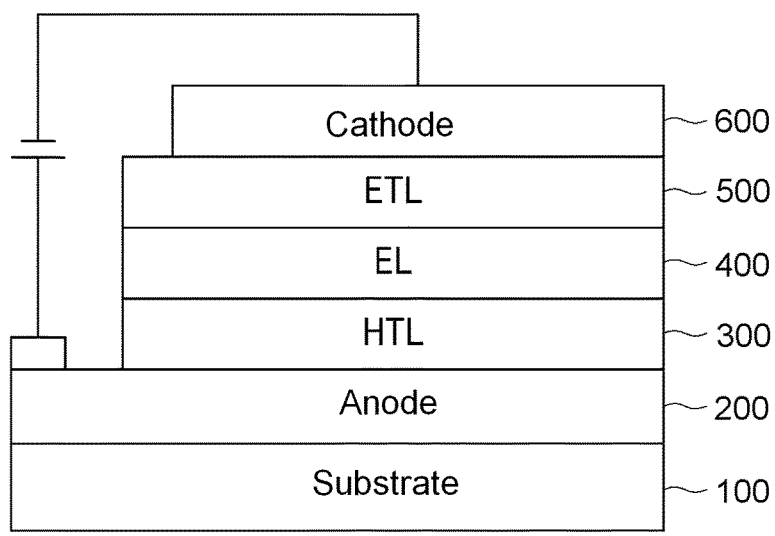
FIG. 5 is a schematic diagram illustrating an another exemplary embodiment of an electronic device.

FIG. 5 is a schematic diagram illustrating another exemplary embodiment of the electronic device. Referring to FIG. 5, the electronic device includes an anode 200, a hole transport layer ("HTL") 300 formed on a surface of the anode 200, an emission layer ("EL") 400 formed on a surface of the HTL 300 opposite anode 200, an electron transport layer ("ETL") 500 formed on a surface of the EL 400 opposite the HTL 300, and a cathode 600 formed on a surface of ETL 500 opposite EL 400, where the successive layers are formed in this order on a surface of substrate 100. The emission layer (EL) 400 may contain the nanocrystal composite.

A more detailed description of exemplary embodiments will be described with reference to the following examples. However, these examples are given merely for the purpose of illustration and are not to be construed as limiting the scope of the embodiments.

EXAMPLES

Example 0.01 mmol of bis(2,2,6,6-tetramethyl-4-piperidyl)sebacate is added to a toluene solution (OD per mL=0.1, where OD is optical density at 505 nm) of green nanocrystals having a core-shell structure of CdSe/CdSZnS (average particle size of 5-6 nm with a core diameter of 3-4 nm and shell thickness of 2-3 nm; no dispersant), and then 95% ethanol (45 ml) is added thereto. The mixture was centrifuged to remove the toluene and ethanol. The precipitate was dissolved in 1 ml chloroform.

The resulting chloroform solution (OD per mL=0.005, where OD is optical density at 505 nm) is mixed with 0.8 mL of a silicon resin (DOW CORNING® OE-6630 A/B Kit, where the ratio of OE-6630A/OE-6630B=4:1 w/w). The chloroform is completely removed under vacuum to give a nanocrystal composite.

A UV light emitting diode chip is mounted on a silver (Ag) substrate having a recessed portion. The nanocrystal composite is applied to cover the UV light emitting diode chip, heated in an oven at 150° C. for about 1 hour while maintaining a constant temperature, and cooled to room temperature to provide the light emitting diode.

Comparative Example

The procedure of Example 1 is repeated to prepare Comparative Example 1, except that the bis(2,2,6,6-tetramethyl-4-piperidyl)sebacate is not used.

Measurements of Power Conversion Efficiency

Figure 6:
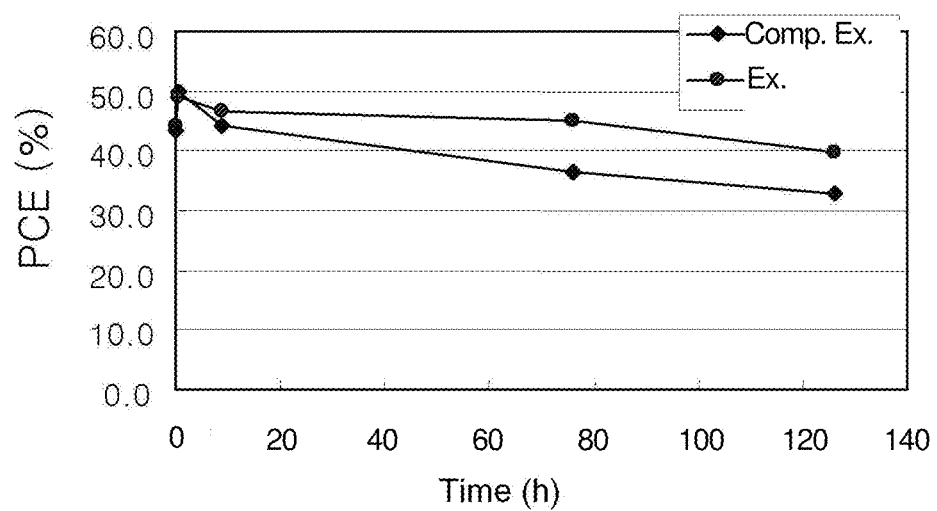
FIG. 6 is a plot of power conversion efficiency ("PCE") versus time, showing changes in the power conversion efficiency of the display devices fabricated in the Example and the Comparative Example.

The light emitting diodes fabricated in Example 1 and Comparative Example 1 are measured for power conversion efficiency (PCE) as a function of time while being operated at 60 mA. A plot of the results are shown in FIG. 6. In the plot, it can be seen that power conversion efficiency, which initially maximized at about 49% PCE, degrades more rapidly for the Comparative Example without the radical scavenger (to about 33% PCE after 130 hours operation), than for the Example having the radical scavenger (to about 40% PCE after 130 hours operation). From these results, it can be concluded that the use of the radical scavenger ensures more stable operation of the light emitting diode with higher power conversion efficiency (i.e., a consistently higher PCE as shown in FIG. 6) for a longer period of time.

As seen in the foregoing, the exemplary embodiments of the semiconductor nanocrystal composites protect nanocrystals from degradation by radicals and thereby ensure greater stability and long-term operation of applied devices when compared to semiconductor nanocrystals without radical inhibitors, while maintaining the inherent characteristics of the semiconductor nanocrystals.

Although exemplary embodiments have been described herein with reference to the foregoing embodiments, those skilled in the art will appreciate that various modifications and changes are possible without departing from the spirit of the invention as claimed in the accompanying claims. Therefore, it is to be understood that such modifications and changes are encompassed within the scope of the invention.

What is claimed is:

1. A semiconductor nanocrystal composite comprising semiconductor nanocrystals, a matrix material, and a radical scavenger disposed between each of the semiconductor nanocrystals and the matrix material, wherein a substantially entire surface of each of the semiconductor nanocrystals is coated with the radical scavenger, further wherein the substantially entire surface of each of the semiconductor nanocrystals is the perimeter of each of the semiconductor nanocrystals.

2. The composite of claim 1, wherein the radical scavenger is selected from the group consisting of piperidine compounds, hydroxylamine compounds, lactone compounds, benzophenone compounds, benzotriazole compounds, and mixtures thereof.

3. The composite of claim 1, wherein the radical scavenger is represented by Formula 1:

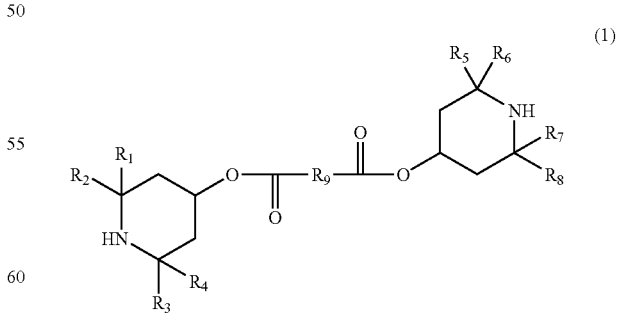

wherein each $R_1$ to $R_8$ is independently a $C_1$-$C_{24}$ alkyl group and $R_9$ is a $C_4$-$C_{24}$ alkylene.

4. The composite of claim 1, wherein the radical scavenger is represented by Formula 2:

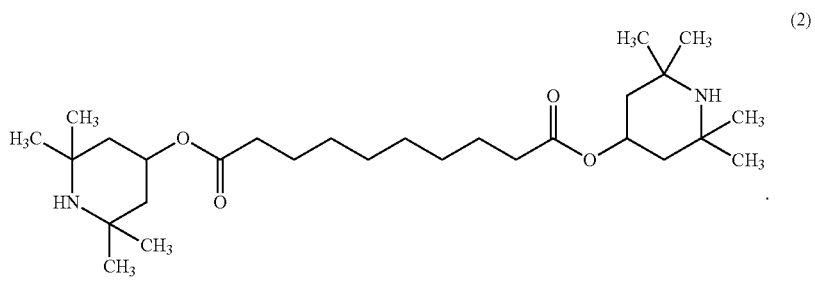

(2)

5. The composite of claim 1, wherein the semiconductor nanocrystals are selected from the group consisting of Group II-VI semiconductor compounds, Group II-V semiconductor compounds, Group III-VI semiconductor compounds, Group III-V semiconductor compounds, Group IV-VI semiconductor compounds, Group II-III-VI compounds, Group II-IV-VI compounds, Group II-IV-V compounds, alloys thereof, and any mixture thereof.

6. The composite of claim 1, wherein the semiconductor nanocrystals have a core-shell structure.

7. The composite of claim 1, wherein the shell comprises one or more layers.

8. The composite of claim 1, wherein the semiconductor nanocrystals have a multilayer structure.

9. The composite of claim 8, wherein the multilayer structure comprises at least one alloy interlayer comprising two or more different materials at the interface between the adjacent layers.

10. The composite of claim 9, wherein the alloy interlayer comprises an alloy having a composition gradient.

11. An electronic device comprising the semiconductor nanocrystal composite of claim 1.

12. A semiconductor nanocrystal composite comprising a matrix containing a semiconductor nanocrystals and a radical scavenger directly surrounding a substantially entire surface of the matrix, wherein the substantially entire surface of the matrix is the perimeter of the matrix.

13. The composite of claim 12, wherein the matrix contains semiconductor nanocrystals, a matrix material, and a radical scavenger present between the semiconductor nanocrystals and the matrix material.

14. An electronic device comprising the semiconductor nanocrystal composite of claim 12.

* * * * *